Patented May 17, 1938

2,117,681

UNITED STATES PATENT OFFICE 2,117,681

MILK PRODUCTS

Anthony R. Sanna and Filip Leon Sanna, Madison, Wis.

No Drawing. Application August 11, 1936, Serial No. 95,442

9 Claims. (Cl. 99—54)

This invention is directed to a milk product and a process of making the same wherein the proteins are separated from the lactose, the proteins being hydrolyzed, and the lactose inverted and decomposed, with the effect to produce a highly hygroscopic product with substantially complete elimination of crystallization through inversion.

In the following specific description of the invention, reference is had particularly to skimmed milk, but it is to be particularly understood that by this reference no intention is made to eliminate the use of the method in connection with other milks nor to consider as beyond the purview of the present invention slight variations in the specific details of the method to meet the normal and obviously substantially different specific characteristics of the milk other than skimmed milk.

In order that the method may be more definitely understood, a specific example of the method in connection with skimmed milk will be given. Ordinary skimmed milk is first subjected to a heat treatment of approximately 195° F., with the result of bringing the casein and albuminoids to a state of substantially similar physical conditions. While held at this temperature, dilute hydrochloric acid is added to bring the pH of the milk to 4.4, that is to a point where substantially complete precipitation occurs, producing a coagulation of the casein and albuminoids and liberating such small amounts of butter fat as may be contained in the original skimmed milk. This detail of the process is substantially similar to that described in patents issued to Anthony R. Sanna No. 1,414,214, April 25, 1922, and No. 1,929,450, October 10, 1933. The present process deals with the coagulated mass of the casein and albuminoids, preferably though not necessarily obtained in the manner described. In carrying out the present process, the mass is held at or brought to substantially the temperature previously referred to and under these conditions for a period of 90 minutes. At the end of this period, the proteins are hydrolyzed to primary and secondary proteoses, peptones and amino acids.

The hydrolytic action on the proteins is determined by the pH to which the original milk is reduced and also the time and temperature involved in this treating period. In the specific instance noted, the average casein composition of skimmed milk, approximately 28.36%, there is produced 6.81% proteoses and 9.68% answering in general character to peptones but undoubtedly containing amino and other suitable nitrogenous compounds.

The action on the lactose resulting from the more or less specific treatment above referred to, that is the heat, acid and time period, results in a hydrolysis of lactose to galactose and dextrose (d-glucose). Average skimmed milk contains approximately 53% of lactose and, by the method described, inversion of such lactose is effected in all but approximately 9.61% of the complete amount.

In the further steps of the method, after the mass has been held for a period of 90 minutes at approximately 195° F., it is cooled to approximately 130° F., and at this point dilute sodium hydroxide is added to bring the pH of the mass up to approximately 9.5, and the mass is permitted or caused to continue to cool until a temperature of approximately 60° F. is reached.

The action of the alkali on the mass is to render soluble the proteins, proteoses and peptones which have been formed, some of these proteins requiring a pH as high as 9.5 to be completely dissolved. The action of the alkali upon the remaining lactose results in a decomposition, the sugar molecule undergoing rearrangement with the formation of d-galactose, pseudotagatose and other products of composition not now well understood.

The action of the dilute alkali upon the product formed by acid hydrolysis is such as to transform this into a mixture of isomeric hexoses, that is d-talose, d-tagatose, 1-sorbose and galtose. The action of the alkali will change about 15% of the lactose monohydrate into a non-carbohydrate form, so that it now neither reduces Fehling's solution nor affects the polarimeter.

After the mass has been alkalified to the above-mentioned pH, it is run through a homogenizer for emulsification. The final pH is governed by the use to which the product is to be put, for example by the addition of acid a product having a pH of approximately 7 may be produced, which product will have a comparatively low water absorption, whereas if the pH is 9, the product will have a materially increased water capacity. The product may then be condensed and used as such or dried.

The product produced is highly hygroscopic and when whipped with four parts of water, there is produced a product which will withstand heat and is irreversible. The product is admirably suited where it is desired to produce and maintain a foam, as in the manufacture of ice cream, confectionery foams, baking, etc.

The product, when used in the manufacture of bread, results in a finer crumb, better texture and a thinner crust. When used in cakes and pastry, the product enhances the texture and improves the flavor. The product may also be used in milk chocolate and in the manufacture of condensed milk, and in the latter use the lactose will not crystallize out.

This application is a continuation-in-part of application Serial No. 43,598.

What is claimed to be new is:

1. A process of making a food product, consisting in subjecting skimmed milk to a temperature sufficient to insure that the casein and albuminoids will reach a state of substantially similar physical conditions, adding to the mass, while maintaining the temperature, sufficient acid to cause the pH of the milk to reach a point where substantially complete precipitation of the casein and albuminoids results, maintaining the acid and temperature conditions for a period of time sufficient to hydrolyze the proteins to primary and secondary proteoses, peptones and amino acids and to cause hydrolysis of the lactose, then reducing the temperature of the mass, and adding an alkali to cause an increase in the pH of the mass to a degree to render soluble the hydrolyzed proteins.

2. A process of making a food product, consisting in subjecting skimmed milk to a temperature sufficient to insure that the casein and albuminoids will reach a state of substantially similar physical conditions, adding to the mass, while maintaining the temperature, sufficient acid to cause the pH of the milk to reach a point where substantially complete precipitation of the casein and albuminoids results, maintaining the acid and temperature conditions for a period of time sufficient to hydrolyze the proteins to primary and secondary proteoses, peptones and amino acids and to cause hydrolysis of the lactose, then reducing the temperature of the mass, adding an alkali to cause an increase in the pH of the mass to a degree to render soluble the hydrolyzed proteins, and then creating a final pH condition to vary the capacity for water absorption.

3. The process of making a food product consisting in subjecting skimmed milk to a temperature of approximately 195° F., adding an acid to bring the pH of the milk to between 4 and 5, maintaining the mass at the temperature noted for approximately 90 minutes, cooling the mass to approximately 130° F., adding an alkali to bring the pH of the mass to between 9 and 10, permitting the mass to further cool, and adding acid to change the pH condition to vary the capacity for water absorption.

4. The process of making a food product consisting in subjecting skimmed milk to a heat treatment of approximately 195° F., adding dilute hydrochloric acid to bring the pH of the milk to substantially 4.4, maintaining the heat and acid condition of the mass for 90 minutes, cooling the mass to approximately 130° F., adding dilute sodium hydroxide to bring the pH of the mass to substantially 9.4, further cooling the mass, emulsifying the mass, and then adding acid to provide a pH condition for controlling the water absorption capacity.

5. The process of making a food product consisting in subjecting skimmed milk to a heat treatment of approximately 195° F., adding a dilute acid to bring the pH of the milk to 4.4, maintaining this condition for a period sufficient to compel hydrolysis of the proteins and inversion of the lactose, cooling the mass to approximately 130° F., adding an alkali to bring the pH of the mass to substantially 9.5 to render soluble the hydrolyzed proteins, further cooling the mass, and subjecting it to emulsification.

6. A process for making a food product wherein skimmed milk has been subjected to a temperature treatment to insure that the casein and albuminoids will reach a stage of substantially similar physical conditions and an acid treatment to cause complete precipitation of the casein and albuminoids, such process consisting in subjecting the acid mass to a temperature and time period sufficient to hydrolyze the proteins to primary and secondary proteoses, peptones and amino acids and to cause hydrolysis of the lactose, and then reducing the temperature of the mass and adding an alkali to cause an increase in the pH of the mass to a degree to render soluble the hydrolyzed proteins.

7. A process of making a milk product from a coagulated mass of the casein and albuminoids of skimmed milk obtained by temperature and acid treatment, consisting in subjecting the acid mass to a temperature and time period sufficient to hydrolyze the proteins to primary and secondary proteoses, peptones and amino acids and to cause hydrolysis of the lactose, and then reducing such temperature and adding an alkali to cause an increase in the pH of the mass to render soluble the hydrolyzed proteins.

8. A process of producing a food product from the acid precipitation of coagulated casein and albuminoids of skimmed milk, consisting in subjecting the acid mass to a temperature and time period sufficient to hydrolyze the proteins to primary and secondary proteoses, peptones and amino acids and to cause hydrolysis of the lactose, and then reducing the temperature of the mass and adding an alkali to cause an increase in the pH of the mass to a degree to render soluble the hydrolyzed proteins.

9. A process of producing a food product from the acid precipitation of coagulated casein and albuminoids of skimmed milk, consisting in subjecting the mass to a temperature of approximately 195° F. and adding a dilute acid to bring the pH of the milk to approximately 4.4 and maintaining the acid and temperature conditions for approximately 90 minutes to hydrolyze the proteins to primary and secondary proteoses, peptones and amino acids and to cause hydrolysis of the lactose, then adding an alkali to bring the pH of the mass to approximately 9.5, and permitting the mass to cool to aproximately 60° F. to render the hydrolyzed proteins soluble.

ANTHONY R. SANNA.
FILIP LEON SANNA.